C. F. STODDARD.
SUPPORTING MEANS FOR ELECTRIC MOTORS.
APPLICATION FILED AUG. 21, 1911.
1,243,358.
Patented Oct. 16, 1917.
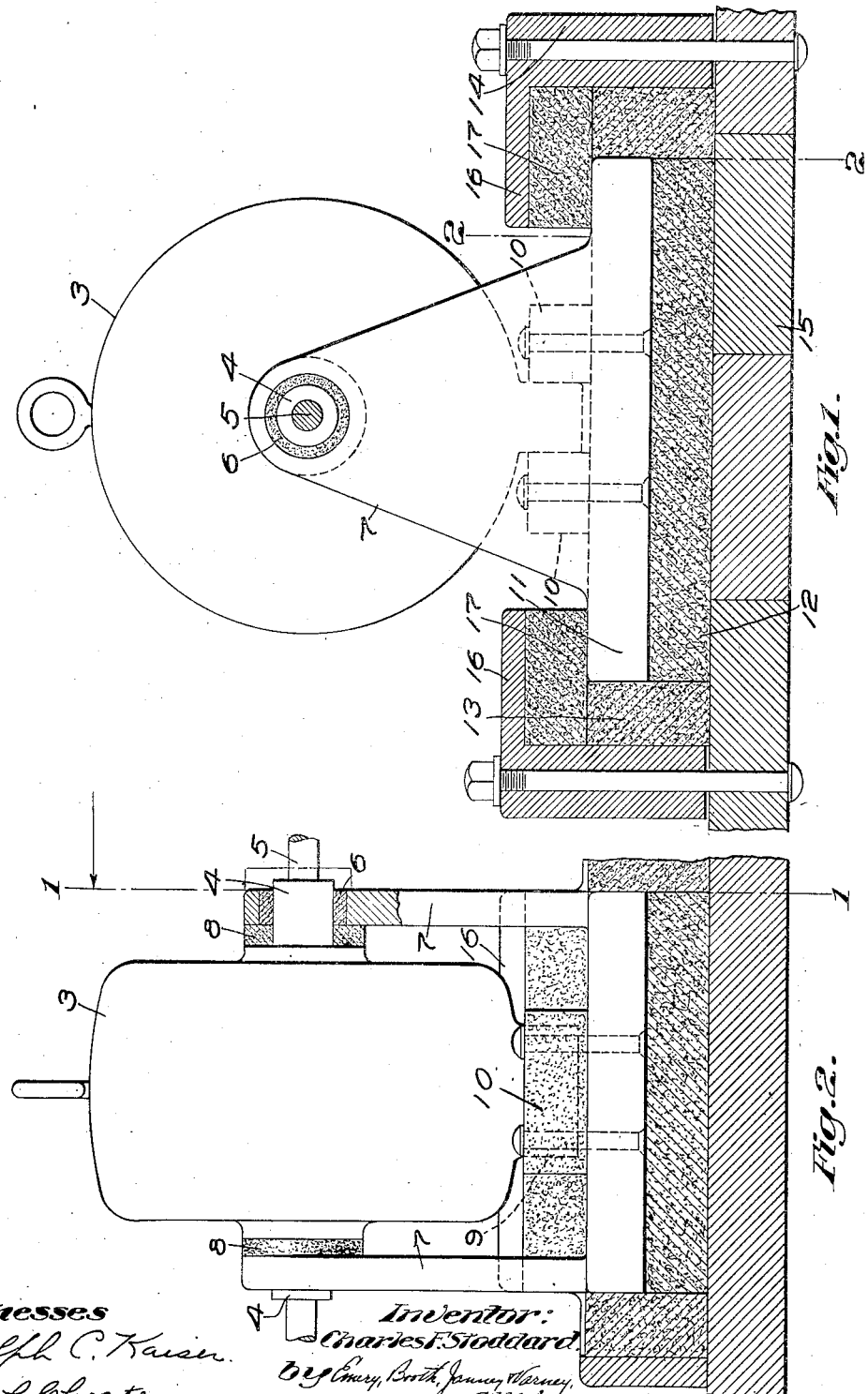

UNITED STATES PATENT OFFICE.

CHARLES F. STODDARD, OF BOSTON, MASSACHUSETTS.

SUPPORTING MEANS FOR ELECTRIC MOTORS.

1,243,358.    Specification of Letters Patent.    Patented Oct. 16, 1917.

Application filed August 21, 1911. Serial No. 645,068.

*To all whom it may concern:*

Be it known that I, CHARLES F. STODDARD, a citizen of the United States, and a resident of Boston, in the county of Suffolk and State of Massachusetts, have invented an Improvement in Supporting Means for Electric Motors, of which the following description, in connection with the accompanying drawings, is a specification, like characters on the drawings representing like parts.

This invention relates to a manner of mounting electric motors such that the vibration and noise thereof shall be reduced to a minimum.

The invention is especially useful in connection with alternating current motors which set up noisy vibrations which, unless absorbed by some means, are very objectionable where a silent motor is desired as, for instance, in driving motors for automatic player pianos and the like.

The character of the invention will be readily understood by reference to one practicable embodiment shown in the accompanying drawings by way of illustration.

In the drawings:

Figure 1 shows a motor in end elevation, a part of the support thereof being in section on a line 1—1 of Fig. 2;

Fig. 2 is a section (viewed from the right in Fig. 1) on the line 2—2 of Fig. 1.

The motor 3 shown in the drawings has its casing provided with projecting bearings 4, 4 which are in close proximity to the axis of the rotor of the motor. The motor is preferably supported exclusively by these bearings 4, 4 for the reason that the vibrations set up in the operation of the motor are believed to diminish in amplitude toward the axis of the rotor. Hence, it is desired to support the motor as nearly as practicable, proximate the axis of the rotor in order that the vibrations transmitted to the supporting means shall be of minimum amplitude. The rotor or armature of the illustrative motor is provided with a shaft 5 and the bearings 4, 4 are preferably mounted in felt bushings 6, one encircling each bearing, said bushings being mounted in standards 7, 7 respectively. Felt gaskets 8, 8 may be interposed between the motor casing and adjacent portions of the standards 7.

It is furthermore desirable that the immediate support of the motor, whether located proximate the rotor axis or not, shall have a rotative engagement with that part of the motor structure which rests upon the support; and that this rotative engagement be coaxial with the rotor With this arrangement, the vibrations of the motor which are set up in a generally circumferential direction about the axis of the rotor, are not transmitted directly to the supports as would be the case if the motor engaged its supports by a square or otherwise non-rotative fit. The effectiveness of this manner of supporting the motor is increased by employing a vibration-absorbent means such as the bushing 6 suitably interposed between the bearing surfaces of the motor structure and its support. The motor structure as a whole may be prevented from rotating upon the supporting bearings by a lug 9 on the motor casing which is embraced between opposed stops 10, 10 preferably of yielding material such as felt or the like secured in any convenient manner, as by riveting, to the preferably heavy bed plate 11 which carries the standards 7, 7.

The standards 7, 7 and bed plate 11 may be provided by a single casting which is preferred to be substantially heavy in order to lower the center of gravity of the support and by its inertia to counteract the vibration of the motor, which, in some degree, may be transmitted through the felt bushing 6 and the felt stops 10, 10.

The inertia plate 11 is preferably located at a substantial distance from the axis of the motor rotor so that the vibrations transmitted to the supporting means proximate the rotor axis shall be transmitted to the inertia plate by what is, in effect, a long lever arm which serves to diminish the force of said vibrations as applied to the inertia plate, thereby increasing the effective resistance offered to said vibrations by the inertia plate.

The bed plate or inertia plate 11 is preferably mounted upon a thick bed 12 of felt or the like and also encircled at its edges by felt stops 13 to prevent any substantial shifting of the plate 11 and to absorb such vibration as the plate 11 may tend to impart. Preferably surrounding the felt bed 12 and the encircling felt stop 13 is a casting 14 which may be bolted or otherwise secured to the floor 15 upon which the motor and its support rests. Preferably the encircling felt stop 13 and the plate 11 fit tightly within the casting 14 in order that the parts may be assembled with a snug fit.

A retaining device or devices 16, 16 may be provided to overlie the plate 11 to prevent its being lifted or tilted from the felt bed 12; and preferably the device or devices 16 are cushioned by felt cushions 17, 17.

The illustrative construction just described is found to be of excellent advantage in substantially deadening or absorbing the vibration of a motor, particularly an alternating current motor; and, as will appear to those skilled in the art, a motor support embodying this invention is highly advantageous to be used in situations requiring a substantially silent motor as, for instance, in automatic player pianos.

It is to be understood that the illustrative construction and organization herein described may be variously modified within the proper scope of this invention; for example, by replacing the specific materials mentioned, by others having equivalent qualities or by adding to or subtracting from the cushioning or absorbing media. Obviously, this invention may be adapted to motors of various types and shapes.

Claims:

1. The combination of an electric motor having a casing therefor and an armature shaft; bearings proximate the armature shaft projecting from said casing; felt bushings encircling said bearings; standards supporting said bushings; a lug projecting from said casing; felt stop means embracing said lug; an inertia plate secured to said standards and supporting said felt stop means; a thick felt bed supporting the inertia plate; felt stop means embracing the edges of the inertia plate; retaining means overlying the inertia plate; and felt cushioning means interposed between said retaining means and the inertia plate.

2. The combination of an electric motor having a casing therefor and an armature shaft; bearings proximate the armature shaft, projecting from said casing; felt bushings encircling said bearings; standards supporting said bushings; a lug projecting from the motor casing; felt stop means embracing said lug; an inertia plate secured to said standards and supporting said felt stop means; a thick felt bed supporting the inertia plate; and felt stop means embracing the edges of the inertia plate.

3. The combination of an electric motor having a casing therefor and an armature shaft; bearings proximate the armature shaft, projecting from said casing; felt bushings encircling said bearings; standards supporting said bushings; a lug projecting from the motor casing; felt stop means embracing said lug; an inertia plate secured to said standards and supporting said felt stop means; and a thick felt bed supporting the inertia plate.

4. The combination of an electric motor having a casing therefor and an armature shaft; bearings coaxial with the armature shaft; felt bushings encircling said bearings; standards supporting said bushings; a relatively heavy plate secured to said standards; a thick felt bed supporting the inertia plate; and overlying a portion thereof, and means to engage the overlying portion of the felt bed to secure said plate in place.

5. The combination of an electric motor having a casing therefor and an armature shaft; bearings coaxial with the armature shaft; felt bushings encircling said bearings; standards supporting said bushings; a lug projecting from the motor casing; and felt stop means embracing said lug.

6. The combination with an electric motor having a rotor shaft and supporting devices proximate the axis of its rotor shaft; of vibration-absorbent rests for said supporting devices to absorb vibration proximate the rotor shaft; yielding stop means to engage a part of the motor remote from the rotor shaft; and a vibration-absorbing bed of felt for supporting the motor; the entire combination being supported upon a vibration-absorbing bed of felt or the like.

7. The combination of an electric motor with supporting means therefor engaging the motor rotatively in proximity to the axis of its rotor; a vibration-absorbing bed for said supporting means; and vibration-absorbing means for anchoring said supporting means in position upon said bed.

In testimony whereof, I have signed my name to this specification, in the presence of two subscribing witnesses.

CHARLES F. STODDARD.

Witnesses:
LAURENCE A. JANNEY,
ROBERT H. KAMMLER.